United States Patent
Molnar et al.

(10) Patent No.: US 9,697,641 B2
(45) Date of Patent: *Jul. 4, 2017

(54) ALPHA-TO-COVERAGE USING VIRTUAL SAMPLES

(75) Inventors: Steven E. Molnar, Chapel Hill, NC (US); Emmett M. Kilgariff, San Jose, CA (US); Walter E. Donovan, Saratoga, CA (US); Christian Amsinck, Durham, NC (US); Robert Ohannessian, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 1013 days.

This patent is subject to a terminal disclaimer.

(21) Appl. No.: 12/904,927

(22) Filed: Oct. 14, 2010

(65) Prior Publication Data

US 2011/0090250 A1 Apr. 21, 2011

Related U.S. Application Data

(60) Provisional application No. 61/252,079, filed on Oct. 15, 2009.

(51) Int. Cl.
  *G09G 5/00* (2006.01)
  *G06T 15/50* (2011.01)
  *G06T 15/00* (2011.01)
  *G09G 5/36* (2006.01)
  *G09G 5/393* (2006.01)

(52) U.S. Cl.
  CPC .......... *G06T 15/503* (2013.01); *G06T 15/005* (2013.01); *G09G 5/363* (2013.01); *G09G 5/393* (2013.01); *G09G 2360/123* (2013.01)

(58) Field of Classification Search
  CPC ....... G06T 2200/12; G06T 15/40; G06T 5/00; G09G 5/00; G09G 5/02
  See application file for complete search history.

(56) References Cited

U.S. PATENT DOCUMENTS

| | | | | |
|---|---|---|---|---|
| 4,714,428 A * | 12/1987 | Bunker | .................. | G06T 15/20 434/43 |
| 5,123,085 A * | 6/1992 | Wells | .................... | G06T 15/503 345/421 |
| 7,333,119 B1 * | 2/2008 | King et al. | ..................... | 345/611 |
| 7,817,165 B1 * | 10/2010 | Donham et al. | .............. | 345/619 |
| 2008/0284780 A1 * | 11/2008 | Hsu | ............................... | 345/422 |

* cited by examiner

*Primary Examiner* — Weiming He
(74) *Attorney, Agent, or Firm* — Artegis Law Group, LLP

(57) ABSTRACT

One embodiment of the present invention sets forth a technique for converting alpha values into pixel coverage masks. Geometric coverage is sampled at a number of "real" sample positions within each pixel. Color and depth values are computed for each of these real samples. Fragment alpha values are used to determine an alpha coverage mask for the real samples and additional "virtual" samples, in which the number of bits set in the mask bits is proportional to the alpha value. An alpha-to-coverage mode uses the virtual samples to increase the number of transparency levels for each pixel compared with using only real samples. The alpha-to-coverage mode may be used in conjunction with virtual coverage anti-aliasing to provide higher-quality transparency for rendering anti-aliased images.

20 Claims, 12 Drawing Sheets

ALPHA-TO-COVERAGE USING VIRTUAL SAMPLES

CROSS-REFERENCE TO RELATED APPLICATIONS

This application claims priority benefit to U.S. provisional patent application titled, "Alpha-To-Coverage Value Determination Using Virtual Samples," filed on Oct. 15, 2009 and having Ser. No. 61/252,079.

BACKGROUND OF THE INVENTION

Field of the Invention

The present invention generally relates to graphics processing and more specifically to alpha-to-coverage using virtual samples.

Description of the Related Art

Anti-aliasing techniques that increase the sampling rate are used to improve the quality of images produced from rendered three-dimensional graphics primitives. Multiple sample locations are specified for each pixel and the sample coverage of the graphics primitives is represented by a per-pixel coverage mask that includes a bit for each one of the multiple samples. The coverage mask is used to determine the contribution of the graphics primitive to the final color for the pixel.

When a graphics primitive is texture mapped using a texture map that includes an alpha value that specifies transparency, the conventional approach is to blend the color of the foreground pixel with the background color in proportion to the alpha value. This requires sorting primitives in back-to-front or front-to-back order, which may be expensive or impractical.

Accordingly, what is needed in the art is a system and method for determining high resolution coverage masks that represent textured transparency when anti-aliasing is enabled.

SUMMARY OF THE INVENTION

One embodiment of the present invention sets forth a technique for converting alpha values into pixel coverage masks. The alpha values may be read from a texture map or computed in a shader. Geometric coverage is sampled at a number of "real" sample positions within each pixel. Color and depth values are computed for each of these real samples. Fragment alpha values are used to determine an alpha coverage mask for the real samples and additional "virtual" samples, in which the number of bits set in the mask is proportional to the alpha value. An alpha-to-coverage mode uses the virtual samples to increase the number of transparency levels compared with using only real samples. The alpha-to-coverage mode may be used in conjunction with virtual coverage anti-aliasing to provide higher-quality textured transparency for rendering anti-aliased images.

Various embodiments of a method of the invention for producing a pixel coverage mask based on an alpha value include combining a virtual coverage mask that indicates which virtual samples and real samples within a pixel are covered by a graphics primitive and a quantized alpha mask based on the alpha value to produce the pixel coverage mask. A link field is determined that indicates links between the virtual samples and the real samples. The link field is adjusted based on the pixel coverage mask to link any orphaned virtual sample to one of the real samples, where each virtual sample inherits color data computed for the real sample to which the virtual sample is linked and the pixel coverage mask and the link field for the pixel are output.

Various embodiments of the invention include a processor comprising an alpha-to-coverage unit that is configured to combine a virtual coverage mask that indicates which virtual samples and real samples within a pixel are covered by a graphics primitive and a quantized alpha mask based on an alpha value to produce a pixel coverage mask. The alpha-to-coverage unit is also configured to determine a link field that indicates links between the virtual samples and the real samples and adjust the link field based on the pixel coverage mask to link any orphaned virtual sample to one of the real samples, where each virtual sample inherits color data computed for the real sample to which the virtual sample is linked. The alpha-to-coverage unit outputs the pixel coverage mask and the link field for the pixel.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
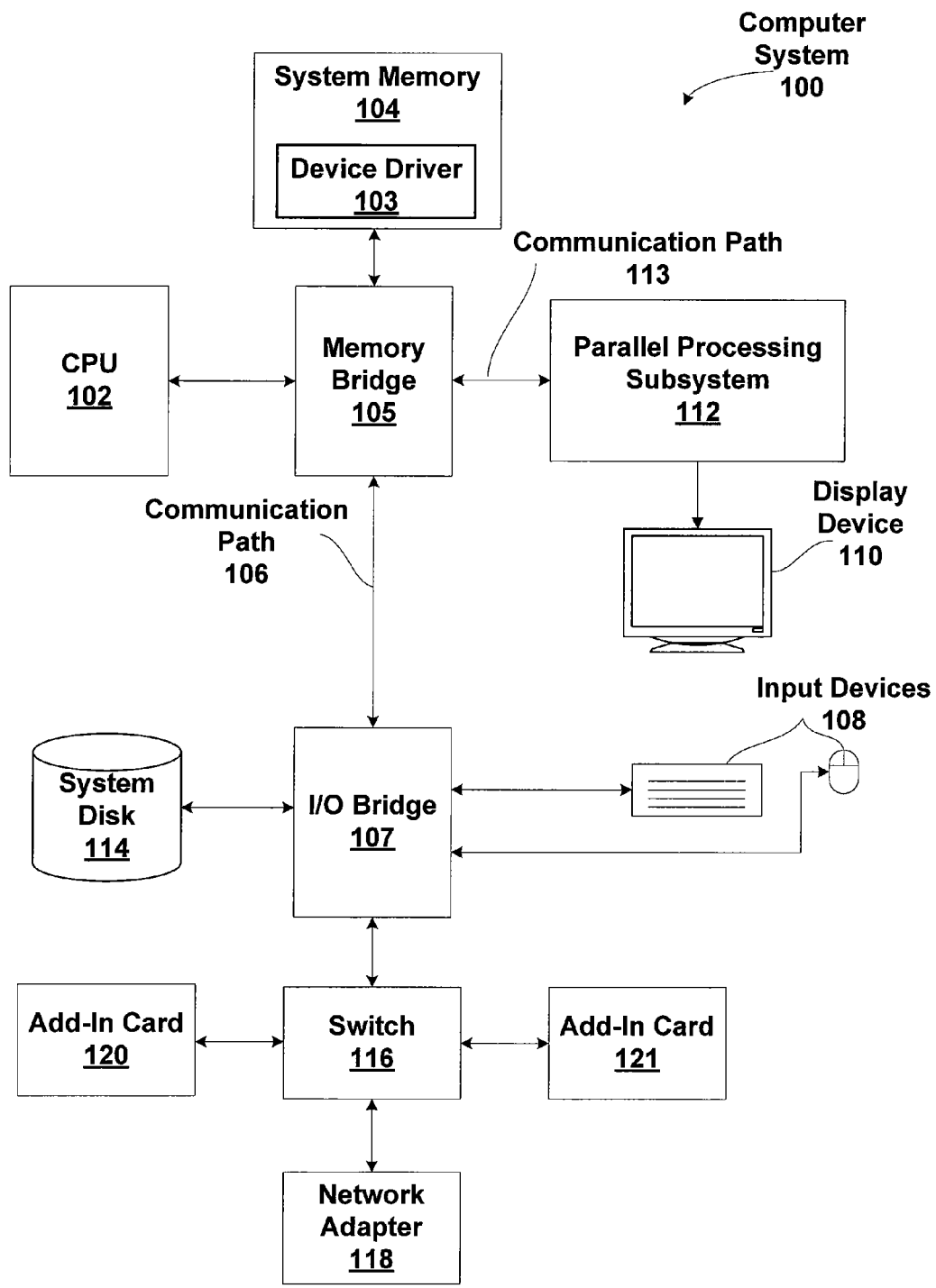
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
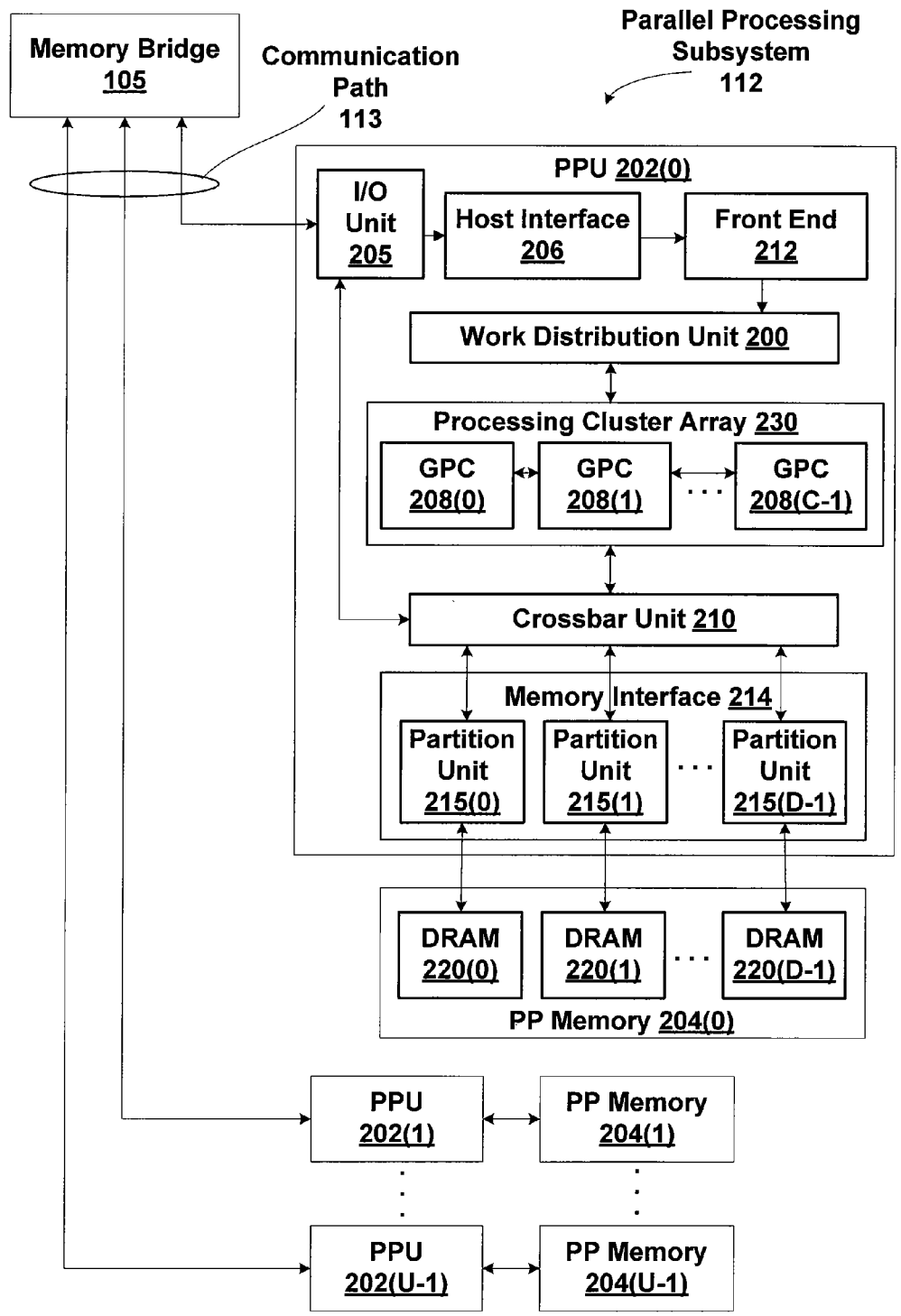
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a primitive distribution unit 200, which receives commands defining processing tasks from front end unit 212. Processing tasks include indices of data to be processed, e.g., surface (patch) data, primitive data, as well as state parameters and commands defining how the data is to be processed (e.g., what program is to be executed). Primitive distribution unit 200 may be configured to fetch the indices corresponding to the data, or primitive distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A primitive distribution unit 200 may be configured to produce tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen-space to produce a rendered image. Intermediate data produced by GPCs 208, such vertex attributes, may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
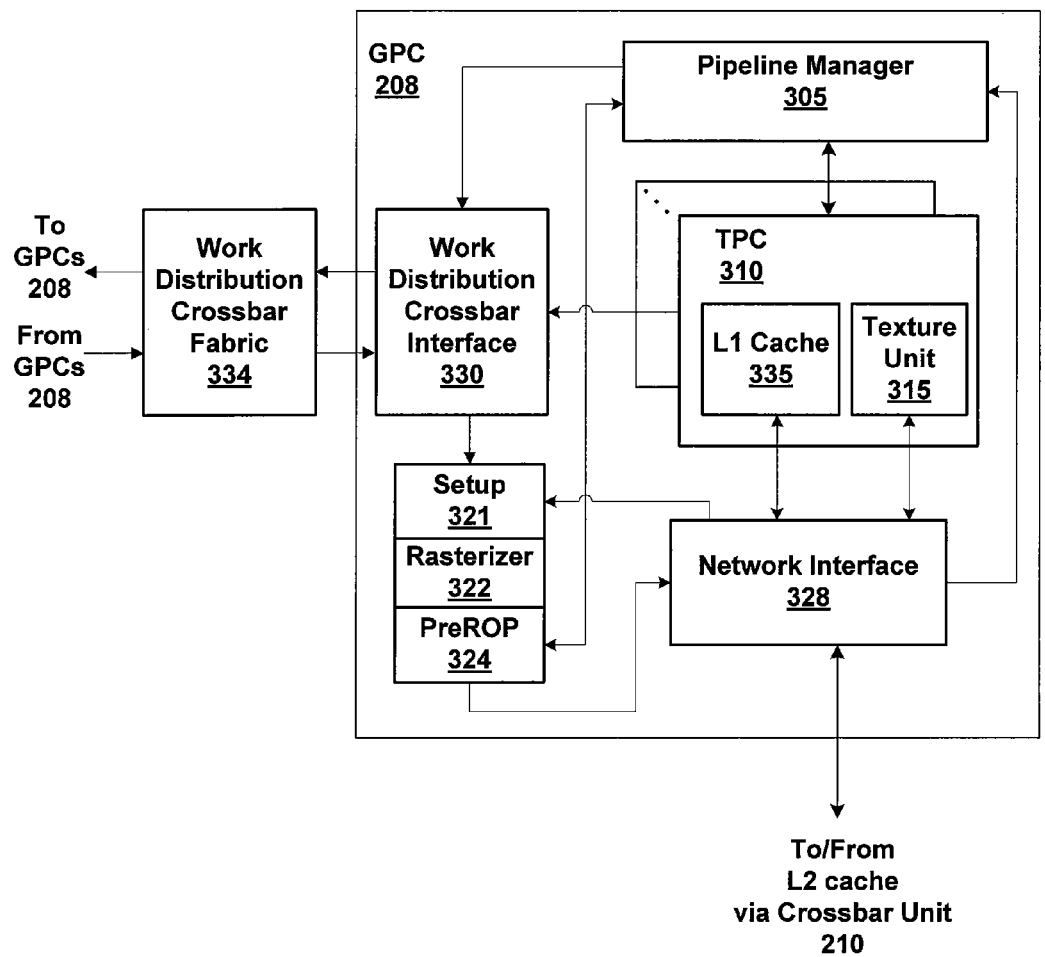
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

The primitive distribution unit 200 distributes processing tasks to each TPC 310 within the GPCs 208 via crossbar unit 210. In particular the primitive distribution unit 200 distributes primitives for object-space (geometry) processing by the TPCs 310. A pipeline manager 305 within each GPC 208 distributes the object-space processing tasks to streaming multiprocessors within each of the TPCs 310. Pipeline manager 305 may also be configured to control a work distribution crossbar interface 330 to distribute state parameters and commands to the TPCs 310 for object-space processing and screen-space processing.

In one embodiment, each GPC 208 includes a number M of TPCs 310, where M≥1, each TPC 310 configured to process one or more thread groups. Also, each TPC 310 advantageously includes an identical set of functional execution units (e.g., arithmetic logic units, and load-store units, and the like) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an TPC 310 is referred to herein as a "warp" or "thread group." As used herein, a "thread group" refers to a group of threads concurrently executing the same program on different input data, with one thread of the group being assigned to a different processing engine within a TPC 310. A thread group may include fewer threads than the number of processing engines within the TPC 310, in which case some processing engines will be idle during cycles when that thread group is being processed. A thread group may also include more threads than the number of processing engines within the TPC 310, in which case processing will take place over multiple clock cycles. Since each TPC 310 can support up to G thread groups concurrently, it follows that up to G*M thread groups can be executing in GPC 208 at any given time.

Additionally, a plurality of related thread groups may be active (in different phases of execution) at the same time within a TPC 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the TPC 310, and m is the number of thread groups simultaneously active within the TPC 310. The size of a CTA is generally determined by the programmer and the amount of hardware resources, such as memory or registers, available to the CTA.

Each TPC 310 contains an L1 cache 335 or uses space in a corresponding L1 cache outside of the TPC 310 that is used to perform load and store operations. Each TPC 310 also has access to L2 caches within the partition units 215 that are shared among all GPCs 208 and may be used to transfer data produced during object-space primitive processing to TPCs 310 to perform screen-space primitive processing. Finally, TPCs 310 also have access to off-chip "global" memory, which can include, e.g., parallel processing memory 204 and/or system memory 104. It is to be understood that any memory external to PPU 202 may be used as global memory. Additionally, an L1.5 cache may be included within the GPC 208, configured to receive and hold data fetched from memory via memory interface 214 requested by TPC 310, including instructions, uniform data, and constant data, and provide the requested data to TPC 310. Embodiments having multiple TPCs 310 in GPC 208 beneficially share common instructions and data cached in an L1.5 cache.

Each GPC 208 includes a network interface 328 that may be configured to map virtual addresses into physical addresses. In other embodiments, the mapping of virtual addresses into physical addresses may be performed within the memory interface 214. A set of page table entries (PTEs) is used to map a virtual address to a physical address of a tile and optionally a cache line index. Address translation lookaside buffers (TLB) or caches which may reside within a TPC 310 or the L1 cache 335 or GPC 208. The physical address is processed to distribute surface data access locality to allow efficient request interleaving among partition units. The cache line index may be used to determine whether or not a request for a cache line is a hit or miss.

A GPC 208 may be configured such that each TPC 310 includes a texture unit 315 for performing texture mapping operations, e.g., determining texture sample positions, reading texture data, and filtering the texture data. Texture data is read from a texture L1 cache or in some embodiments from the L1 cache 335 within TPC 310 and is fetched from an L2 cache, parallel processing memory 204, or system memory 104, as needed.

As previously explained, TPCs 310 receive batches of primitives and perform object-space processing. Each TPC 310 outputs a stream of object-space processed primitive descriptors to the work distribution crossbar interface 330 in order to redistribute the object-space processed primitive descriptors via the work distribution crossbar fabric 334 to one or more GPCs 208 for screen-space processing. A primitive descriptor includes the primitive type (triangle strip, triangle mesh, line, and the like), flags, and indices of vertices. The object-space processing includes one or more of vertex shading, tessellation shading, and geometry shading. The screen-space processing is rasterization of the primitives, and may include one or more of scan conversion, shading, depth/stencil operations, and blending. TPC 310 may also output the object-space processed primitive data, i.e., vertex attributes, for storage in an L2 cache, parallel processing memory 204, or system memory 104 via crossbar unit 210.

A preROP (pre-raster operations) 324 is configured to receive data (screen-space processed primitives) from TPC 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., TPCs 310, setup units 321, rasterizers 322, or preROPs 324 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Distributed Object-Space Processing

The application program presents graphics primitives to the parallel processing subsystem 112 serially via the host interface 206. The graphics primitives may be in the form of indexed lists, stored in memory. A rendering "drawcall" is sent serially over the host interface 206 and each drawcall may reference a large list of primitives to be rendered. An important design consideration is the granularity of distributing the primitives to the TPCs 310 for object-space processing. For best load balancing, a fine-grained distribution of individual primitives to the TPCs 310 is desired. However, since primitives are generally encoded as indexed triangle meshes or triangle strips, with vertices shared among multiple triangles, it is advantageous to distribute primitives in multiple-primitive batches, such that triangles that share a vertex are generally in the same batch.

In some embodiments the primitive distribution unit 200 reads a buffer containing indices of vertices in an associated vertex buffer. The indices implicitly define primitives and point to vertex data stored in the vertex buffer. The primitive distribution unit 200 groups the primitives represented by the indices of vertices into batches for distribution to the TPCs 310. The batch encodes a number of sequential primitives represented as a set of vertex indices and primitive topology information, e.g., a list of primitives (either points, lines, triangles, or patches) that reference indices in the set of vertex indices. Batches may include 32 vertex pointers, which is large enough to benefit from vertex reuse, but small enough to balance the parallel geometry processing workload across the TPCs 310 while minimizing buffering needed to store the primitives for processing. The batches may be assigned to the TPCs 310 in the system in a round-robin fashion or based on the current loading conditions for object-space primitive processing. The object-space primitive processing comprises geometry processing, including world-to-screen-space transformation, clipping, culling, and vertex shading operations. The result of the parallel object-space primitive processing performed by the TPCs 310 is batches of graphics primitive descriptors that encode transformed vertices defining points, lines, and triangles. The primitive descriptor contains information about the geometric primitive necessary for rendering the pixels covered by the primitives: type of primitive (point, line, triangle), vertex indices that point to buffers storing the vertex attributes, control flags.

The vertex attributes are transferred from the TPCs 310 to the distributed L2 cache via the network interface 328. The vertex attributes may then be read by any of the TPCs 310 that are configured to perform rasterization of the object-space processed primitives.

Distributed Screen-Space Processing

Primitive setup and rasterization are also parallelized over the GPCs 208. Each GPC 208 includes a setup 321, rasterizer 322, and preROP 324. Each GPC 208 is responsible for processing a portion of the screen-space. It is desirable to distribute rasterization in screen-space portions so that shading, texturing, and frame buffer accesses have locality and rasterization of the primitives in each portion may be performed in parallel and independently.

The object-space processed primitive descriptors are routed through the work distribution crossbar fabric to GPCs 208 by the work distribution crossbar interface 330 based on the portion of the image that each object-space processed primitive affects. To make this assignment, the image, called the render target, is subdivided into small "screen tiles," and the screen tiles are partitioned into non-overlapping sets that cover the image. A different GPC 208 is assigned to each screen tile set. In some embodiments each screen tile set includes statically mapped 16×16-pixel regions and GPC 208 performs setup and rasterization for up to one triangle per clock. A given GPC 208 is configured to rasterize each primitive that covers at least one pixel within the portion of the screen-space assigned to the given GPC 208. Large primitives may be rasterized by every GPC 208 while a small primitive may only be rasterized by one GPC 208.

Setup 321 forwards the edge and depth plane equations for object-space processed primitives to the rasterizer 322. Setup 321 stores partial plane equations in a buffer for subsequent retrieval by the fragment shader, when interpolating other attributes. The rasterizer 322 associated with each setup 321 iterates within the primitive bounding box, guided by the edge equations, to identify tiles with sample coverage. The rasterizer 322 contains a coarse stage, which identifies large tiles that are likely to contain sample coverage and a fine stage, which tests sample locations against edge equations. The rasterizer 322 uses knowledge of the GPC screen tile mapping to skip over tiles assigned for processing by other GPCs 208 in zero time. In some embodiments, a hierarchical Z unit which can rapidly reject tiles that are known to lie behind occluding geometry is included between the two rasterizer stages.

The combination of the work distribution crossbar interface 330 and work distribution crossbar fabric 334 implements a distributed sorting structure that routes primitive data between the GPCs 208. The work distribution crossbar interface 330 routes the parallel streams of object-space processed primitive descriptors from the TPCs 310 performing object-space processing into parallel, ordered streams of primitive descriptors for the GPCs 208 performing screen-space processing via the work distribution crossbar fabric 334. Multiple work distribution crossbar interfaces 330 are coupled together through the work distribution crossbar fabric 334 in order to support multiple GPCs 208. Each work distribution crossbar interface 330 receives a stream of object-space processed primitive descriptors from each TPC 310 that performs object-space processing and routes each object-space processed primitive descriptor to one or more GPCs 208 for screen-space primitive processing via the work distribution crossbar fabric 334. Each work distribution crossbar interface 330 then reorders the primitive descriptors received by each GPC 208 that will perform the screen-space processing to match the API primitive ordering. Since each GPC 208 does not process every primitive, some of the primitive descriptor streams reordered by the GPCs 208 will not include every primitive descriptor that is present in the API primitive ordering. A reordered stream is considered to match the API primitive ordering when the primitive descriptors that are present in the reordered stream are in the same order that the same primitive descriptors appear in the API primitive ordering.

Although the object-space processed primitives are reordered by the work distribution crossbar interface 330 into the API primitive order going to each rasterizer 322, the actual processing of the primitives is physically distributed. That is, there is no single point after primitives pass through the primitive distribution unit 200 through which all primitives flow. Importantly, this distributed implementation of primitive distribution permits the system to distribute multiple primitives per clock, up to a peak rate of a primitive per clock at each rasterizer 322 within a GPC 208. Each setup 321 receives a stream of processed primitives that possibly can affect one or more of its screen tiles. The rasterizers 322 proceed to generate pixel or sample data for their assigned tile sets. Each rasterizer 322 operates independently of the others. There is no need for the rasterizers 322 to stay synchronized with each other, since each one operates on its own separate subset of the image, and thus they are non-interfering.

The rasterized and then shaded fragment data produced by a rasterizer 322 and TPC 310 is collected by the pipeline manager 305 and output to the preROP 324. PreROP 324 is configured to receive the shaded fragment data (screen-space processed primitives) from TPC 310, direct the shaded fragment data to the ROP units within partition units 215, and perform optimizations for color blending, organize pixel color data, and perform address translations.

The overall primitive processing rate may reach up to C triangles per clock, where C is the number of GPCs 208. Therefore the primitive descriptors need to be conveyed to the GPCs 208 through the work distribution crossbar fabric 334 by the work distribution crossbar interface 330 at an aggregate rate of C triangles per clock–C*the input rate of an individual GPC 208. Because the parallel processing subsystem 112 is scalable, systems with higher performance may be built by increasing the number of GPCs 208 and/or TPCs 310 in the parallel processing subsystem 112.

Figure 3B:
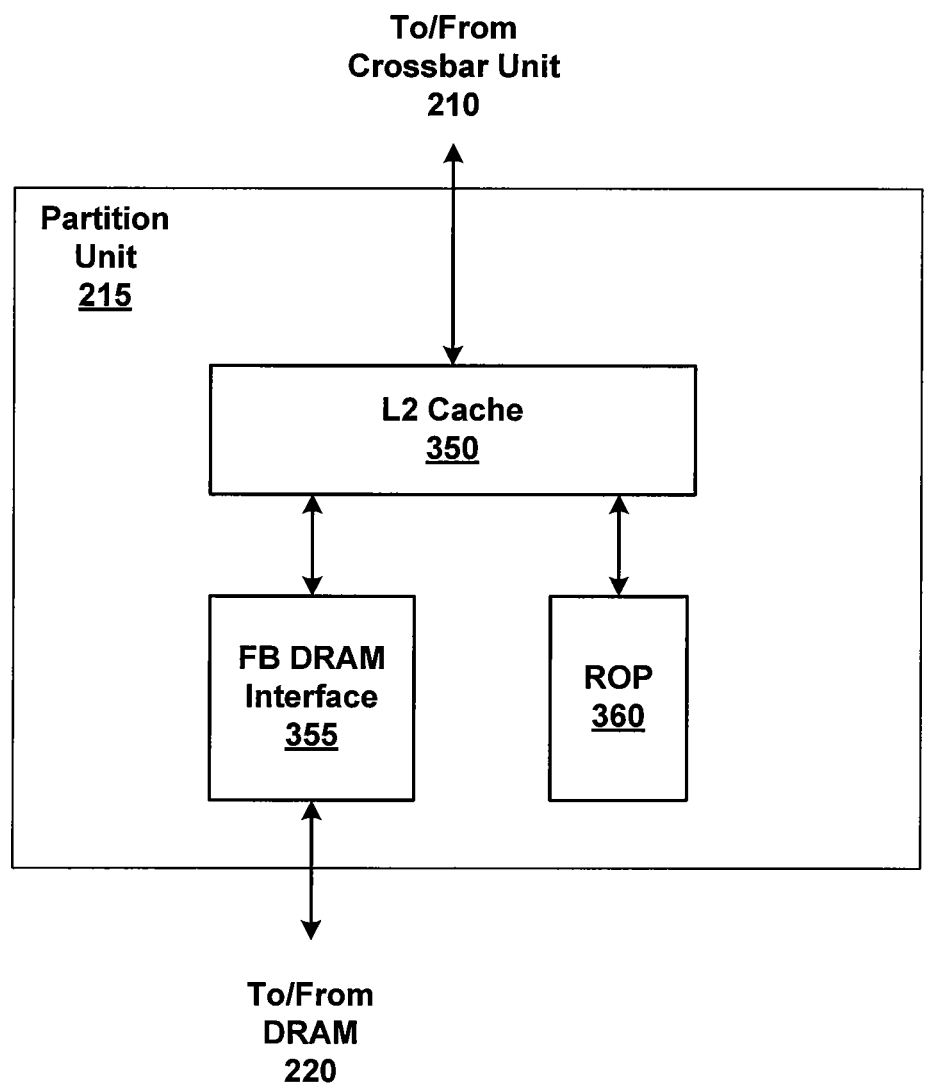
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 3C:
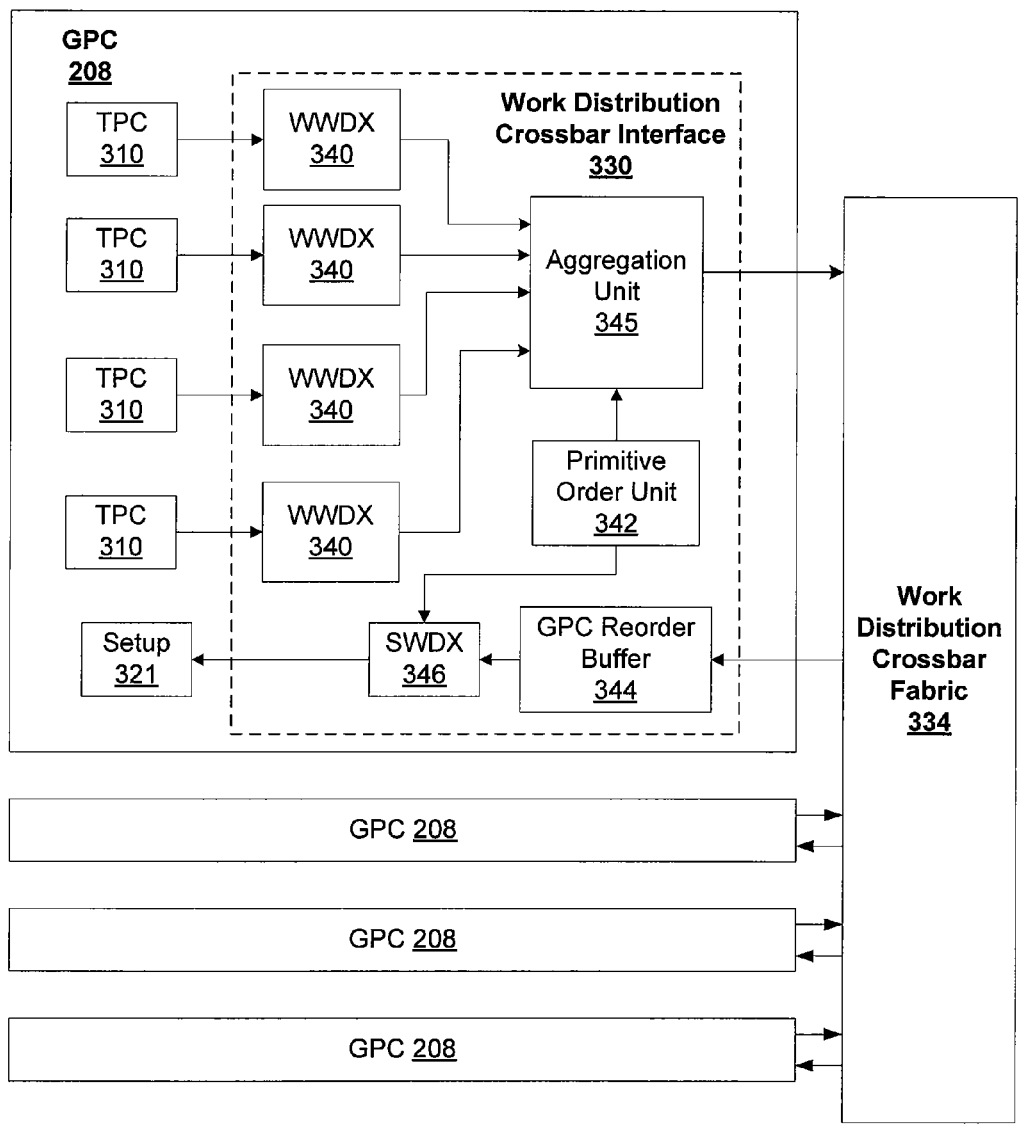
FIG. 3C is a block diagram of a portion of the work distribution crossbar of FIG. 3A, according to one embodiment of the present invention.

FIG. 3C is a block diagram of portions of the GPCs 208 including the work distribution crossbar interface 330 of FIG. 3A, according to one embodiment of the present invention. The work distribution unit 330 includes a set of WWDXes 340 which each are coupled to one of the TPCs 310 to receive the object-space primitive descriptors, primitive bounding boxes, attribute buffer addresses, and end of batch flags from the TPCs 310 within a GPC 208. The TPC 310 computes a primitive bounding box for each primitive descriptor and the WWDX 340 receiving the bounding box compares it with the screen-space tiled mapping of the GPCs 208. A primitive bounding box contains the minimum and maximum X and Y screen-space dimensions for the smallest rectangle that completely contains the primitive. Based on the bounding box size and position, the WWDX 340 determines which GPCs 208 might need to process the primitive by intersecting the screen tile set for each GPC 208 with the bounding box. The WWDX 340 sets bits corresponding to the particular GPCs 208 that should receive the primitive in a GPC (distribution) mask. Small primitives (i.e., primitives that affect only one or a few pixels) will generally affect only one screen tile, and thus will be sent to a single GPC 208. Larger primitives, which affect several screen tiles, will be sent to multiple GPCs 208. In the limit, with small primitives, when there are C GPCs 208, the system can process C different primitives concurrently.

The primitive descriptors for a single batch that is processed by a particular TPC 310 are processed and output by the TPC 310 in the API primitive order. However, the different TPCs 310 may process the batches at different rates so that the batches are output from the TPCs 310 in an order that does not match the API primitive order at a batch level. Therefore, an aggregation unit 345 reorders each batch that is received from the WWDXes 340 to match the API primitive order.

The aggregation unit 345 is configured to merge two or more primitive descriptor streams output by the WWDXes 340 and produce a single primitive descriptor stream that is routed by the work distribution crossbar fabric 334 to the GPCs 208 for object-space processing. In some embodiments, the aggregation unit 345 is omitted and the multiple streams of primitive descriptors are combined and output to the work distribution crossbar fabric 334 by the WWDXes 340 or the multiple streams of primitive descriptors are output directly (combined or not) to the work distribution crossbar fabric 334. The combining of the multiple streams may be performed in a variety of ways without regard to matching the API primitive order.

API primitive order information is provided to the aggregation unit 345 by the pipeline manager 305. When the primitive distribution unit 200 sends batches of primitives to TPCs 310 via the pipeline manager 305, the pipeline manager 305 outputs a sequential order of TPCs 310 that received the batches, so that the aggregation unit 345 within each work distribution crossbar interface 330 can reorder the object-space primitives to match the API primitive order and produce an ordered primitive stream for output to the GPCs 208 for screen-space processing. The pipeline manager 305 may also receive a sequential order of GPCs 208 that received the batches from the primitive distribution unit 200 and output the sequential order of GPCs 208, so that the SWDX 346 within each work distribution crossbar interface 330 can reorder the object-space primitives that are received by each GPC 208 to match the API primitive order and produce an ordered primitive stream for output to the setup 321 for screen-space processing.

The aggregation unit 345 performs the reordering on outgoing primitive descriptors by accepting primitive descriptors from the TPC 310 corresponding to a current TPC identifier (based on the sequential order provided by the pipeline manager 305) until an end of batch flag is detected in the primitive descriptor stream. When an end of batch flag is detected, the next TPC identifier in the sequential order becomes the current TPC identifier. The aggregation unit 345 outputs a stream of object-space processed primitive descriptors that is reordered based on the TPC identifiers. The stream output by each individual GPC 208 matches the API primitive order. However, each receiving GPC 208 (configured to perform screen-space processing) may receive primitive descriptors from one or more outgoing streams transmitted by GPCs 208 (configured to perform object-space processing). On the receiving side of the work distribution crossbar fabric 334, the sequence of GPC identifiers may be used by each SWDX 346 to reorder the batches received from different GPCs 208 so that each setup 321 receives an ordered list of the object-space processed primitive descriptors for rasterization.

The outgoing ordered stream of object-space processed primitives output by an aggregation unit 345 over the dedicated work distribution crossbar fabric 334 includes the following primitive data for each primitive: an attribute buffer address, a primitive descriptor, a GPC mask, a GPC identifier, and an end of batch flag. The GPC identifier indicates the GPC 208 that performed the object-space processing. The attribute buffer address is a pointer to a location in memory where the attribute data for the primitive is stored. When many attributes are associated with each primitive, it is advantageous to carry a pointer to the attribute data through the work distribution crossbar interface 330 rather than carrying the actual attribute data. When the WWDXes 340 output multiple primitive streams directly to the work distribution crossbar fabric 334, i.e., the aggregation unit 345 is omitted, the primitive stream includes the GPC mask, a TPC identifier, a GPC identifier, and an end of batch flag. The TPC identifier indicates the TPC 310 that performed the object-space processing.

The work distribution crossbar fabric 334 routes primitive data for one primitive from a GPC 208 configured to perform object-space processing to one or more GPCs 208 configured to perform screen-space processing based on the GPC mask. In some embodiments each primitive is broadcast to each GPC 208 according to the GPC mask in a single clock cycle. In other embodiments, a primitive is output to only one GPC 208 in a clock cycle so that a primitive that is routed to multiple GPCs 208 is output to each one of the different GPCs 208 in a separate clock cycle. The work distribution crossbar fabric 334 may be configured to use a credit/debit scheme to transmit primitive data between the GPCs 208. A receiving GPC 208 outputs credits indicating the amount of primitive data that can be accepted. The work distribution crossbar fabric 334 may also be configured to arbitrate between two or more primitives that are routed to the same GPC 208 in a clock cycle when a GPC 208 can only accept one primitive per clock cycle.

Each screen-space unit 336 has a GPC reorder buffer 344 that receives and stores the primitive data (excluding the GPC mask and GPC identifier) output by the work distribution crossbar fabric 334. The GPC reorder buffer may be implemented as a multithreaded FIFO for storing the primitive data with one thread per object-space GPC 208 In other embodiments separate FIFOs may be used for each object-space GPC 208. Primitive data are placed in the appropriate thread, based on the GPC identifier, as the primitives are received via the work distribution crossbar fabric 334. In embodiments that omit the aggregation unit 345, primitive data are placed in the appropriate thread, based on the TPC identifier (and the GPC identifier if the TPC identifiers are not unique across the different GPCs 208), as the primitive data are received via the work distribution crossbar fabric 334.

The SWDX 346 removes the primitive descriptors, attribute buffer addresses, and end of batch flags from the multithreaded FIFO in the order specified by the sequential GPC identifier order provided by the pipeline manager 305 and pushes the primitive descriptors and attribute buffer addresses into an output FIFO. The SWDX 346 starts reading primitive descriptors, attribute buffer addresses, and end of batch flags from the FIFO thread for the first GPC that received a batch of primitive data. When the SWDX 346 sees the end of batch flag set in that FIFO thread, the SWDX 346 starts reading from the FIFO thread of the next GPC 208 that received a batch of primitives for object-space processing, and so forth. Thus, the SWDX 346 pulls primitive descriptors and attribute buffer addresses out of the multithreaded FIFO in the API primitive order, and pushes them into the output FIFO within the SWDX 346 in the API primitive order. The setup unit 321 in the respective GPC 208 pops the primitive descriptors and attribute buffer addresses from the output FIFO for screen-space processing. The output FIFO should be deep enough so that the setups 321 are not starved when many primitives are sent to the same setup 321. In some embodiments each rasterizer 322 can process up to a primitive per clock, matching the rate at which primitive descriptors are output by the setup unit 321.

The assignment of screen tile sets to the rasterizers distributes the rasterization workload. The screen tiles are N×M rectangles of samples within the render target. The choice of tile size is a tradeoff between load balancing, which improves with smaller screen tiles, and overhead, which improves with larger screen tiles. Overhead can take the form of primitives that need to be processed by multiple GPCs 208 because the tile size is too small or reduced texture locality. In one embodiment, the tile size is 16×16 pixels. The screen tiles are assigned to rasterizers 322 in an interleaved fashion to balance the workload across the rasterizers 322. For example, the upper-left corner tiles of the render target might be assigned to four rasterizers 322 corresponding to digits 0, 1, 2, and 3, in the following fashion:

First tile row: 0 1 2 3 0 1 2 3 0 1 2 3 . . . .
Second tile row: 1 2 3 0 1 2 3 0 1 2 3 0 . . . .
Third tile row: 2 3 0 1 2 3 0 1 2 3 0 1 . . . .
Fourth tile row: 3 0 1 2 3 0 1 2 3 0 1 2 . . . .

The exact pattern of tile assignments may be specified by a table or calculated algorithmically, and may vary between different systems. One embodiment uses a skewed, interleaved arrangement, as shown above, with the property that if a primitive bounding box is at least C (C=number of rasterizers 322) screen tiles wide or tall, the primitive must necessarily be distributed to all rasterizers 322. This characteristic may be used to simplify the calculation of the GPC mask.

Graphics Pipeline Architecture

Figure 4:
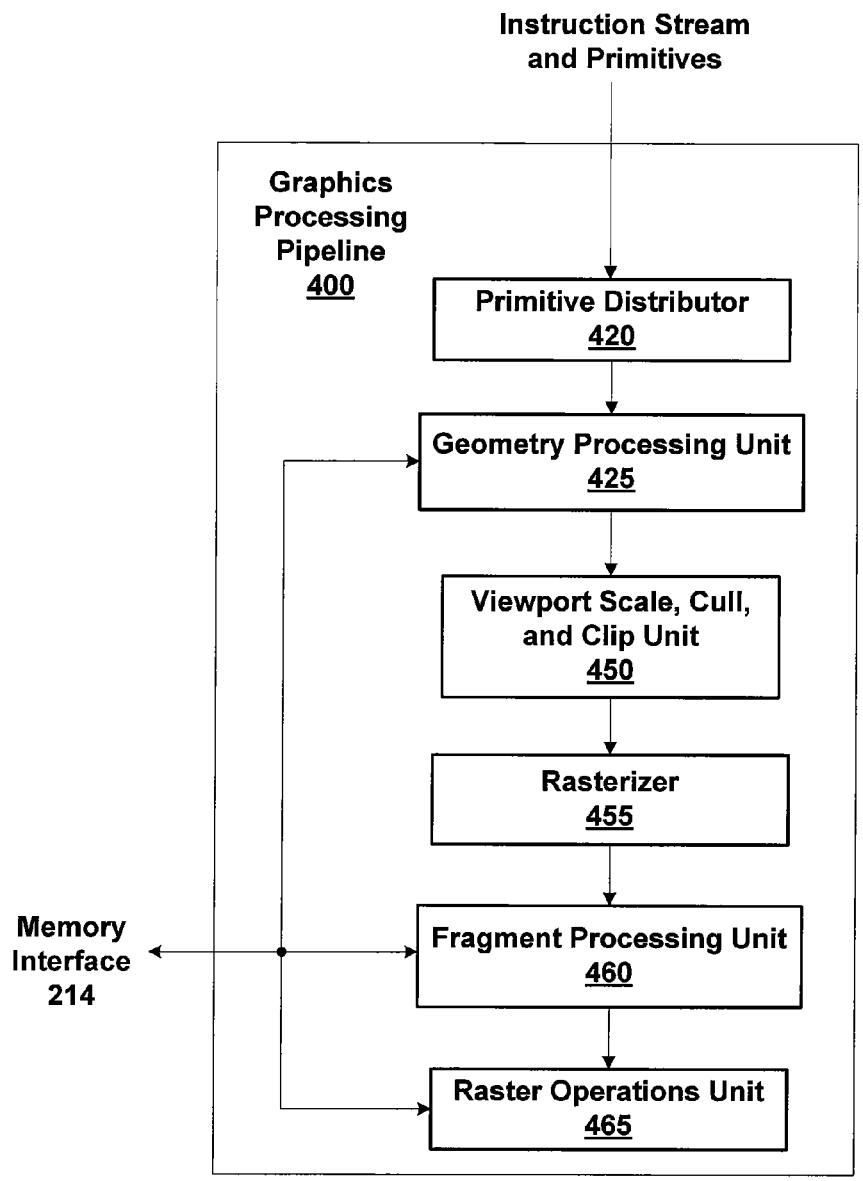
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the TPCs 310 may be configured to perform the functions of one or more of a geometry processing unit 425, and a fragment processing unit 460. The functions of primitive distributer 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Vertex data for high-order surfaces, primitives, and the like may be stored in L1 cache 335, parallel processing memory 204, or system memory 104 and accessed as needed to render the primitives. The functions of the primitive distributer 420 may be performed by the primitive distribution unit 200. Primitive distributer 420 receives pointers to primitive index lists stored in memory. The entries in these index lists point into lists of vertex attributes (vertex buffers), also stored in memory. Because primitives are stored compactly and many primitives can be passed to the primitive distributer 420 in a single draw call, indexed primitive lists and vertex buffers are the most efficient way to convey geometry to the graphics pipeline 400. The front end 212 may be configured to store legacy inline and immediate mode vertices in vertex buffers, so the primitive assembler 420 only has to deal with this one, efficient type of primitive input data, namely primitive index lists. In other embodiments the primitive distributer 420 may receive the vertex data instead of pointers to primitive index lists.

In some embodiments, the GPCs 208 are configured to perform tessellation processing prior to geometry processing. In those embodiments the primitive distributer 420 distributes batches of primitives for tessellation processing to multiple TPCs 310 and streams of tessellated primitive batches are produced. The API primitive ordering may be restored prior to object-space processing of the primitives by either using the same TPCs 208 to perform the object-space processing as was used to perform the tessellation. Alternatively, the primitive batches may be reordered to match the API primitive order after tessellation so that batches of primitives for object-space processing are generated and distributed in API primitive order.

Primitive distributer 420 dices the index list into self-contained batches of indices specifying up to J vertices and K primitives, such that each vertex in a strip, after the first two, specifies a new triangle. In some embodiments, J is 32, K is 30, and batches may occupy from one to four 32B data packets, depending on the number and type of primitive and contain the following information: indices of vertices in the vertex buffer and topology information (which vertices in the batch comprise each primitive). Importantly, the primitive distributer 420 works entirely with primitive indices—it does not touch the vertex data itself. The vertex data is later fetched by the TPC 310 assigned for vertex shading.

The bulk of the data transferred (via indices) between geometry processing and rasterization is vertex attributes. These are the parameters calculated for each vertex, such as x, y, z position, texture coordinates, vertex colors, and other shader parameters. Some parameters, such as x, y, z (position) are needed by the rasterizer to determine primitive coverage and depth values. Other attributes are needed, as interpolated values, by the fragment shader. The number and type of attributes depends on the vertex and fragment shaders.

Vertex attributes need to be buffered from the time they are calculated by the TPCs 310 doing object-space processing until they are needed by setup 322 or the fragment processing unit 460. The amount of data that needs to be buffered is highly variable, depending on the number and type of attributes per vertex. The amount of data may be near zero for full-screen primitives and the amount of data may be extremely high in high primitive rate cases. The amount of data may also be highly variable per GPC 208 when a large number of small primitives fall onto a single screen tile.

Because of these potentially large and highly variable buffering requirements, it may be advantageous to store vertex attributes in the L2 cache 350. The L2 cache 350 is a large, pooled resource that is used for many purposes: caching textures, caching rendered pixels, and caching primitive attributes. In high triangle rate cases a greater amount of attribute buffering is needed, so the bulk of the L2 cache 350 may be used to cache attribute data instead of texture data. When requirements for attribute buffering are low, the L2 cache 350 may be used primarily for caching texture data.

Each TPC 310 performing object-space processing is provided with a fixed size linear buffer that is virtually addressed and cacheable. The addresses used to access these linear buffers wrap, so the linear buffers are actually circular FIFO (first-in, first-out) buffers. As TPCs 310 stream vertex attributes into the circular buffers, the TPCs 310 provide indices for entries written to the work distribution crossbar interface 330, which are conveyed to the GPCs 208 performing the screen-space processing. GPCs 208 that need to read circular buffer entries (CBEs) do so at two points: setup and fragment shader interpolation. Entries that are unneeded by a GPC 208 are skipped—not read by the GPC 208, while other entries may be read by multiple GPCs 208.

Because virtual addressing is used for the circular buffers, the full circular buffer may always be allocated, but only cache lines storing valid data need be resident in the L2 cache 350. When CBEs are written to the L2 cache 350, the cache line may be marked with "no-evict" status, so the cache line storing attribute data will not be flushed from the L2 cache 350. The work distribution crossbar interface 330 also has the task of freeing CBEs when the GPCs 208 are finished with them. To achieve this, the rasterizers 322 track the CBEs through the screen-space processing and signals the work distribution crossbar interface 330 when a CBE may be released. The work distribution crossbar interface 330 keeps a count per CBE of how many screen-space pipelines (where a screen-space pipeline includes the setup 321, rasterizer 322, PreROP 324, and TPCs 310) are using the CBE. When this count for a particular CBE goes to zero, the work distribution crossbar interface 330 may release that CBE.

Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory.

The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Alpha-to-Coverage Determination

When anti-aliasing is used the image quality may be improved through the use of virtual coverage. Color and depth values are computed for a number of "real" sample positions within each pixel to produce "real" samples. Geometric coverage is sampled at real sample locations and at additional "virtual" sample locations, for which color and depth are not stored. Alpha values are used to determine an additional coverage mask for the real samples and virtual samples that is combined with the geometric coverage mask to increase the number of transparency levels compared with using only real samples for each pixel. Anti-aliased image quality is provided without computing color values for each of the virtual samples.

In contrast with the conventional approach of blending the color of the foreground pixel with the background color in proportion to the alpha value, the alpha-to-coverage technique does not require sorting primitives in back-to-front or front-to-back order, so transparent primitives can advantageously be intermixed with opaque or non-transparent primitives. The alpha-to-coverage technique converts the alpha value into a sub-pixel coverage mask whose coverage is proportional to the alpha value. The sub-pixel coverage mask is ANDed with the geometric coverage mask used in multisample rendering. The quality of the final image is dictated by the number of samples per pixel. Unfortunately, common multisample resolutions of 4 or 8 samples per pixel are insufficient to produce high quality images, which generally require 16 to 32 transparency levels for the gradations to appear smooth. In order to improve the image quality, the alpha-to-coverage technique described herein defines additional "virtual" sample locations to increase the number of levels of transparency.

During rasterization, color and z values are computed for each one of the real samples and each virtual sample may link to one or more real sample which provides a color and z value for the virtual sample. The real samples that can be linked to by a virtual sample are the "affinities" for the virtual sample. Each virtual sample that is inside of a primitive (covered by the primitive based on a geometric coverage mask) is linked to a real sample that is also inside of the primitive. Each virtual sample that is outside of the primitive is linked to a real sample that is also outside of the primitive. The most general implementation of virtual sample anti-aliased (VCAA) allows each virtual sample to link with any real sample, i.e., each virtual sample has an affinity to any of the real samples. An association between each virtual sample and one real sample is active (or "linked") by setting a corresponding bit in a link field to 1. In one embodiment, the storage space required to store the link field may be reduced by restricting the particular real samples to which each virtual sample can link, producing a compressed format of VCAA.

The VCAA technique relies only on geometric coverage. In order to augment the VCAA technique to also represent alpha as coverage information, some or all of the virtual sample links are repurposed to represent alpha. Importantly, the virtual samples may be enabled even when the particular virtual sample is not covered by the primitive. The alpha to coverage technique uses the virtual coverage and a quantized alpha mask to provide anti-aliased image quality for transparent graphics primitives. The quantized alpha mask represents the alpha value as a per-pixel coverage mask whereas the geometric coverage mask specifies the (virtual and real) samples within each pixel that are covered when the graphics primitive is intersected with the pixel.

The quantized alpha mask sets a number of bits based on the alpha value, with more bits set as the alpha value increases. Each bit in the quantized alpha mask corresponds to a specific real or virtual sample. The bits are enabled in a predetermined order. When alpha to coverage is used the real samples are processed in the same manner as for the VCAA without alpha to coverage, except that enabling and disabling of the real sample is now dependent on the alpha value. Processing of the virtual samples is also now dependent on the alpha value and the virtual samples are used to control the alpha coverage to a finer level of detail than would be possible if only the real samples were affected by the alpha value.

The quantized alpha mask and geometric coverage mask are combined to produce a source mask. When the combined mask is applied to a previously rendered pixel, one or more virtual samples may become orphaned, where an orphaned virtual sample has a link field with no bits set, i.e., an orphan does not have a link to a real sample. During standard VCAA rendering, orphaned virtual samples are associated with the "nearest" real sample. When alpha-to-coverage is enabled, further cleanup operations may be needed, as described in conjunction with FIGS. 6A and 6B, before the weight for each real sample is determined. A weight of one is assigned to each real sample, and for each virtual sample that is linked to the real sample, the weight of the real sample is increased by one. The weights are then divided by the total number of samples (real and virtual) in a pixel and are used to scale the color of each real sample to produce an anti-aliased image with or without textured alpha.

Figure 5A:
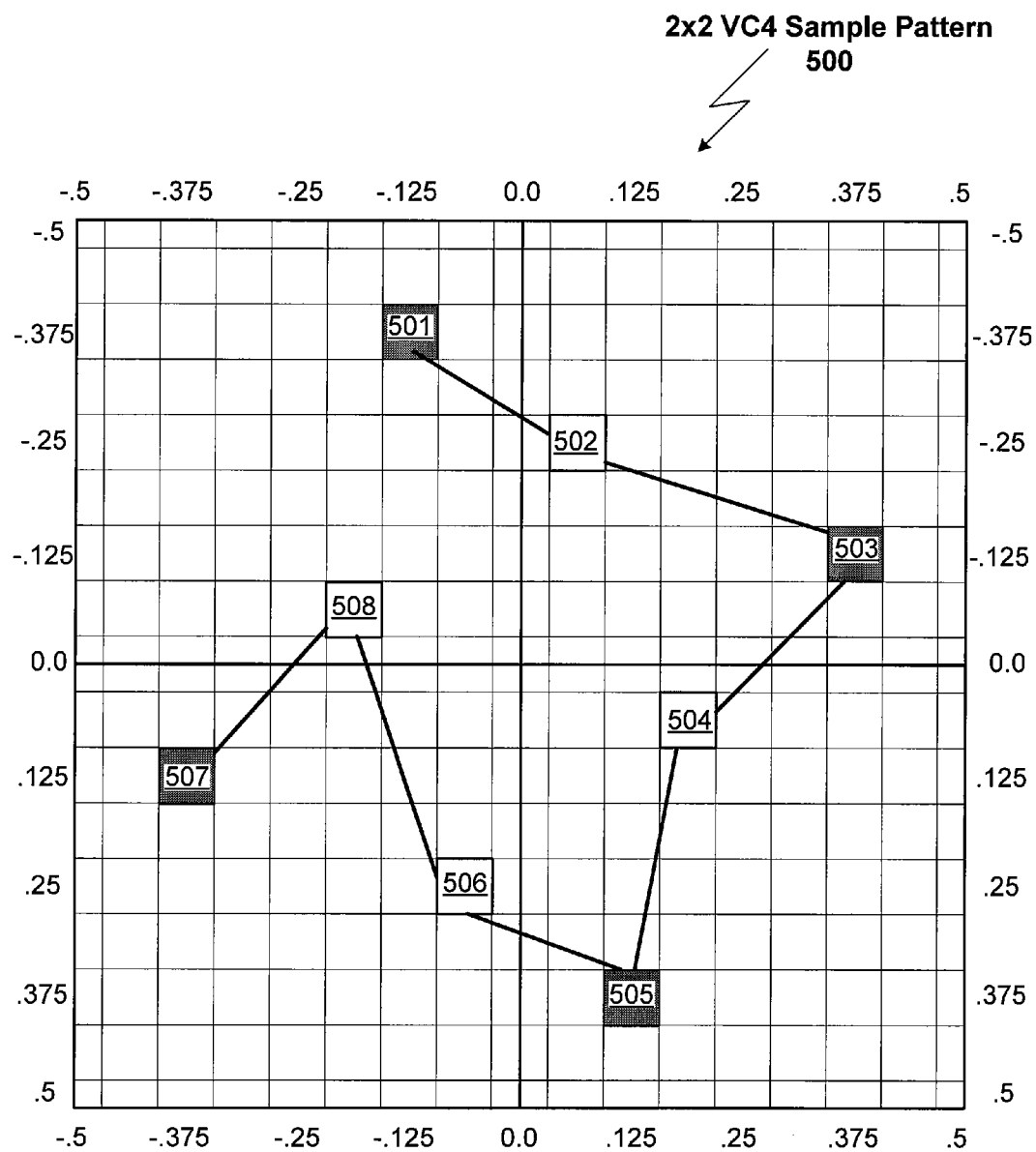
FIG. 5A illustrates a pixel sampling pattern that includes real and virtual samples, according to one embodiment of the invention.

FIG. 5A illustrates a 2×2 VC4 sampling pattern 500 that includes four real samples and four virtual samples, according to one embodiment of the invention. Samples 502, 504, 506, and 508 are virtual samples and samples 501, 503, 505, and 507 are real samples. A similar number of virtual samples (two in this example) are grouped with each real sample, except for the last real sample 507. The lines between the samples indicate the alpha-to-coverage ordering (starting with real sample 501) that is used to enable and disable bits of the quantized alpha mask corresponding to each one of the samples. As the alpha value for each pixel increases more of the samples are enabled in the quantized alpha mask. The real and virtual samples are enabled in a predetermined order based on the alpha value, an alpha-to-coverage ordering, to produce the quantized alpha mask. In one embodiment, the alpha-to-coverage ordering in which bits of the quantized alpha mask are enabled for the 2×2 VC4 sampling pattern 500 is real sample 501, virtual sample 502, real sample 503, virtual sample 504, real sample 505, virtual sample 506, virtual sample 508, and real sample 507. In other embodiments, different orderings may be used for the real and virtual samples. The ordering of the samples is indicated by the lines between the samples, starting with real sample 501 and ending at real sample 507.

An alpha threshold table is defined for the 2×2 VC4 sample pattern 500 that specifies the quantized alpha mask. A transparency value t, that is based on the alpha value for the pixel is used as an alpha coverage index that is input to the threshold table to generate the quantized alpha mask that indicates which real and virtual samples are enabled. The virtual samples are then each linked to one of the real samples based on the affinities.

The transparency input, t ranges from 0 to (NREAL+NVIRT−1), where NREAL is the number of real samples and NVIRT is the number of virtual samples. The number of transparency levels is nine (0 to NREAL+NVIRT, inclusive) since there are eight samples. Alpha may be represented as an 8 bit unsigned value in the range 0 (fully transparent) to 255 (fully opaque). The alpha value for a pixel is truncated or rounded based on the number of samples to produce t. The quantized alpha mask is a function of t such that T(t)=(255*(t+1)+(NREAL+NVIRT)/2)/(NREAL+NVIRT+1). The threshold to enable the first bit of the quantized alpha mask is 28, e.g., T(0)=(255+4)/9=28 (integer math), so no bits of the quantized alpha mask are enabled for alpha values that are less than 28. The threshold to enable all of the bits of the quantized alpha mask is 227, e.g., T(7)=(255*8+4)/9=227. When an alpha value is greater than or equal to 227 all of the bits of the quantized alpha mask are enabled. In some embodiments, the alpha-to-coverage mode is disabled or bypassed when the alpha value is greater than or equal to 227. In sum, the alpha threshold table is constructed to enable the real samples and virtual samples according to the quantized alpha mask as an alpha value increases from zero to 255 and as t increases from zero to (NREAL+NVIRT−1).

For example, when eight samples are used as shown in FIG. 5A with R0, R1, R2, and R3 corresponding to real samples 501, 503, 505, and 507, respectively, and V0, V1, V2, and V3 corresponding to virtual samples 502, 504, 506, and 508, respectively, the alpha-to-coverage ordering is R0 V1 R1 V3 R3 V2 V0 R2. There are nine levels of transparency possible that are specified by the quantized alpha mask. The quantized alpha mask corresponding to each of the different transparency levels is shown in TABLE 1 and may represent the contents of an alpha threshold table.

TABLE 1

| Transparency level | Quantized alpha mask | Enabled samples |
|---|---|---|
| 0 | 00000000 | none |
| 1 | 10000000 | R0 |
| 2 | 11000000 | R0, V1 |
| 3 | 11100000 | R0, V1, R1 |
| 4 | 11110000 | R0, V1, R1, V3 |
| 5 | 11111000 | R0, V1, R1, V3, R3 |
| 6 | 11111100 | R0, V1, R1, V3, R3, V2 |
| 7 | 11111110 | R0, V1, R1, V3, R3, V2, V0 |
| 8 | 11111111 | R0, V1, R1, V3, R3, V2, V0, R2 |

When alpha-to-coverage is applied to a pixel that is fully covered by a geometric primitive, a transparency level of 1 updates R0 as being inside of the geometric primitive and R1, R2, and R3 as being outside of the geometric primitive.

The alpha threshold table also specifies the real sample to which each virtual sample is linked. As previously explained, each virtual sample has some number of real samples that the particular virtual sample may link to. These real samples are referred to as "linkable" real samples for the virtual sample and each link can be enabled or disabled. If all of the links for a virtual sample are disabled, the virtual sample is an orphaned virtual sample. A virtual sample is linked to the preceding real sample in the order of the samples in the quantized alpha mask.

Each virtual sample is linkable to a real sample that precedes or follows (without any intervening real samples) the virtual sample in the alpha-to-coverage ordering. Therefore, virtual sample 502 is linkable to real samples 501 and 503. Virtual sample 504 is linkable to real samples 503 and 505. Virtual samples 506 and 508 are both linkable to real samples 505 and 507. In one embodiment, virtual samples 506 and 508 preferably link to real sample 505, virtual sample 502 links to real sample 501, and virtual sample 504 links to real sample 503. When a bit in the quantized alpha mask corresponding to a virtual sample is enabled, the bit in the mask corresponding to the real sample below (i.e., preceding the enabled virtual sample when the quantized alpha mask is traversed from left to right) the enabled virtual sample will also be enabled, so the virtual sample will be linked to the real sample. This is important since each virtual sample inherits the color value of the real sample to which it is linked. In the event that a virtual sample is orphaned because a real sample it is linked to gets updated, the virtual sample will be linked to another real sample that is associated with a higher threshold in a subsequent step.

Referring back to the quantized alpha mask corresponding to each of the different transparency levels as shown in TABLE 1, when alpha-to-coverage is applied to a pixel that is fully covered by a geometric primitive, a transparency level of 1 updates R0 as being inside of the geometric primitive and no virtual samples are linked to R0. R1, R2, and R3 are updated as being outside of the geometric primitive. Any existing links to R0 are removed. A transparency level of 2 updates R0 and V1 as being inside of the geometric primitive and V1 is linked to R0 only. No other virtual samples link to R0. A transparency level of 3 updates R0 and R1 and V1 as being inside of the geometric primitive and R1, R2, and R3 are updated as being outside of the geometric primitive. V1 is linked to R0 only. No other virtual samples link to either R0 or R1. The alpha-to-coverage ordering is constrained due to the number of links actually available to each virtual sample. A virtual sample that is linkable to only two real samples must be ordered between those two real samples. Additionally, to advantageously reduce spatial artifacts such as those caused by an interaction between an edge going through a pixel and an "edge" created by the alpha-to-coverage technique, the alpha-to-coverage ordering corresponds to a spiral traversal of the sample positions in screen space.

Figure 5B:
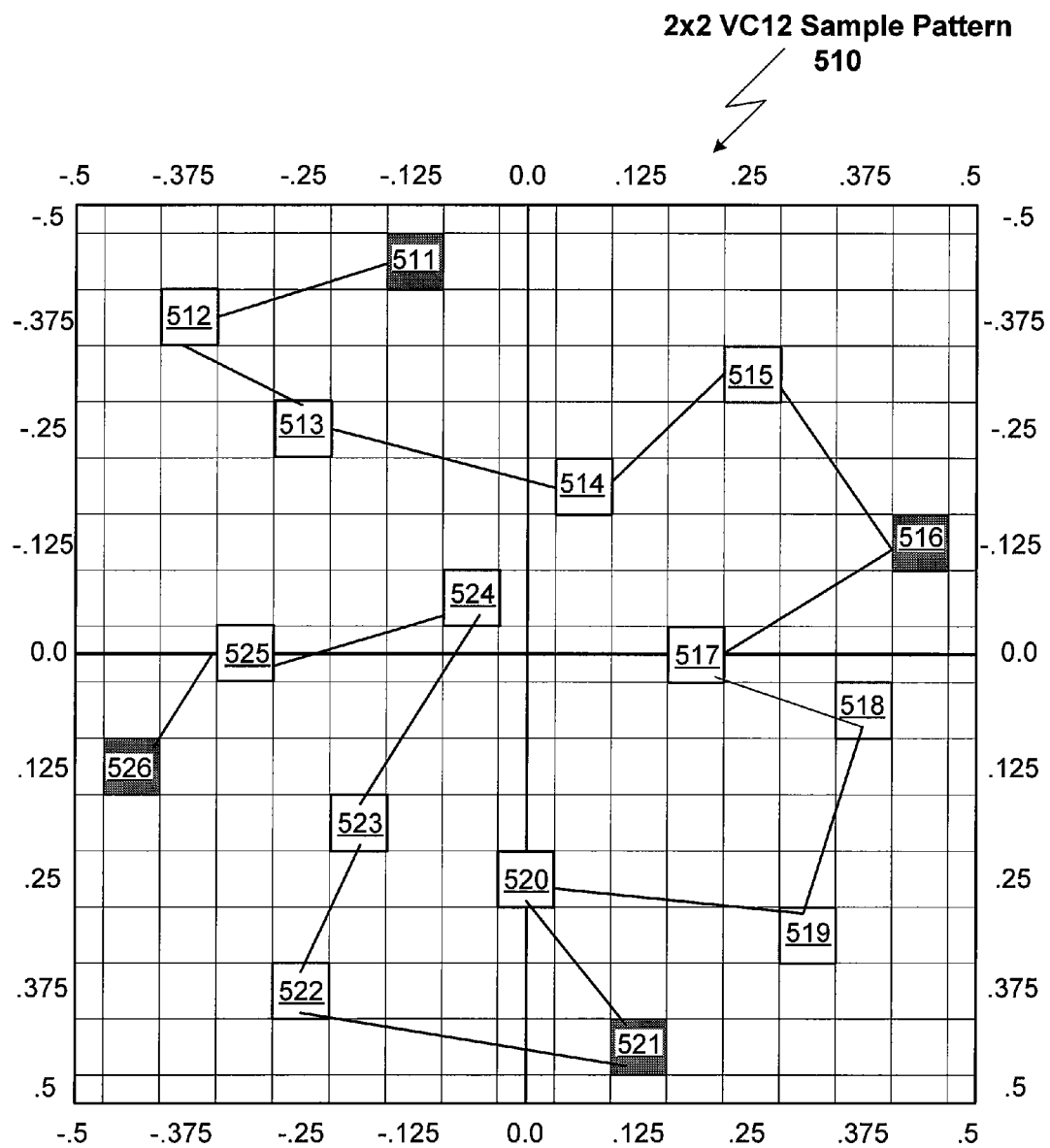
FIG. 5B illustrates another pixel sampling pattern that includes real and virtual samples, according to one embodiment of the invention.

FIG. 5B illustrates a 2×2 VC12 sampling pattern 510 that includes four real samples and twelve virtual samples, according to one embodiment of the invention. Samples 512, 513, 514, 515, 517, 518, 519, 520, 522, 523, 524, and 525 are virtual samples and samples 511, 516, 521, and 526 are real samples. A similar number of virtual samples (four in this example) are positioned between each of the real samples. The lines between the samples indicate the alpha-to-coverage ordering (starting with real sample 512) that is used to enable and disable bits of the quantized alpha mask corresponding to each one of the samples. As the alpha value for each pixel increases more of the samples are enabled in the quantized alpha mask. The alpha-to-coverage ordering in which bits of the quantized alpha mask are enabled for the 2×2 VC12 sampling pattern 510 is real sample 511, virtual sample 512, virtual sample 513, virtual sample 514, virtual sample 515, real sample 516, virtual sample 517, virtual sample 518, virtual sample 519, virtual sample 520, real sample 521, virtual sample 522, virtual sample 523, virtual sample 524, virtual sample 525, and real sample 526, In other embodiments, different orderings may be used for the real and virtual samples.

An alpha threshold table is defined for the 2×2 VC12 sample pattern 510 that specifies the quantized alpha mask. The number of transparency levels is seventeen since there are sixteen samples. The transparency input, t ranges from 0 to (NREAL+NVIRT−1), where NREAL is four and NVIRT is twelve. As previously described, the quantized alpha mask is a function of t such that $T(t)=(255*(t+1)+(NREAL+NVIRT)/2)/(NREAL+NVIRT+1)$. The threshold to enable the first bit of the quantized alpha mask is 15, e.g., $T(0)=(255+8)/17=15$ (integer math), so no bits of the quantized alpha mask are enabled for alpha values that are less than 15. The threshold to enable all of the bits of the quantized alpha mask is 240, e.g., $T(15)=(255*16+8)/17=240$. When an alpha value is greater than or equal to 240 all of the bits of the quantized alpha mask are enabled. In some embodiments, the alpha-to-coverage function is disabled or bypassed when the alpha value is greater than or equal to 240. In sum, the alpha threshold table is constructed to enable the real samples and virtual samples according to the quantized alpha mask as an alpha value increases from zero to 255 and as t increases from zero to (NREAL+NVIRT−1).

The alpha threshold table also specifies the real sample to which each virtual sample is linked. A virtual sample is preferably linked to the real sample that precedes the virtual sample (based on the alpha-to-coverage order). Therefore, virtual samples 515, 513, 514, and 512 preferably link to real sample 511, virtual samples 519, 517, 520, and 518 preferably link to real sample 516, and virtual samples 522, 524, 525, and 523 preferably link to real sample 521. In the event that a virtual sample is orphaned because a real sample it is linked to gets updated, the virtual sample will be linked to another real sample that is associated with a higher threshold in a subsequent step.

Figure 5C:
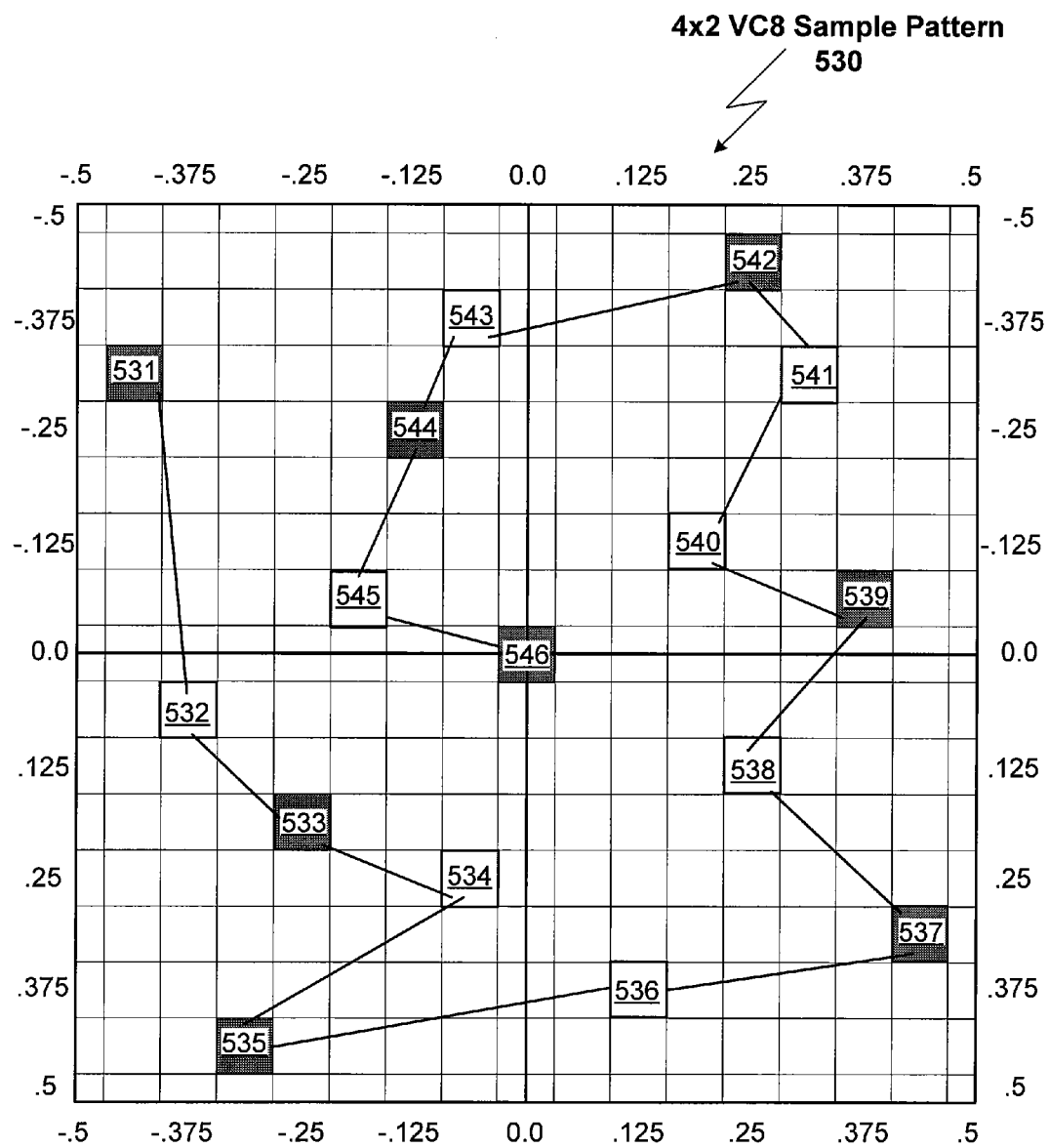
FIG. 5C illustrates another pixel sampling pattern that includes real and virtual samples, according to one embodiment of the invention.

FIG. 5C illustrates a 4×2 VC8 sampling pattern 530 that includes eight real samples and eight virtual samples, according to one embodiment of the invention. Samples 532, 534, 536, 538, 540, 541, 543, and 545 are virtual samples and samples 531, 533, 535, 537, 539, 542, 544, and 546 are real samples. A similar number of virtual samples (one or two in this example) are ordered between each successive real sample. The lines between the samples indicate the alpha-to-coverage ordering (starting with real sample 531 and ending with real sample 546) that is used to enable and disable bits of the quantized alpha mask corresponding to each one of the samples. The alpha-to-coverage ordering in which bits of the quantized alpha mask are enabled for the 2×4 VC8 sampling pattern 530 is real sample 531, virtual sample 532, real sample 533, virtual sample 534, real sample 535, virtual sample 536, real sample 537, virtual sample 538, real sample 539, virtual sample 540, virtual sample 541, real sample 542, virtual sample 543, real sample 544, virtual sample 545, and real sample 546. In other embodiments, different orderings may be used for the real and virtual samples.

An alpha threshold table is defined for the 2×4 VC8 sample pattern 530 that specifies the quantized alpha mask. The number of transparency levels is seventeen since there are sixteen samples. As previously described, the quantized alpha mask is a function of t such that $T(t)=(255*(t+1)+(NREAL+NVIRT)/2)/(NREAL+NVIRT+1)$. In some embodiments, the alpha-to-coverage function is disabled or bypassed when the alpha value is greater than or equal to 240. In sum, the alpha threshold table is constructed to enable the real samples and virtual samples according to the quantized alpha mask as an alpha value increases from zero to 255 and as t increases from zero to (NREAL+NVIRT−1).

The alpha threshold table also specifies the real sample to which each virtual sample is preferably linked. A virtual sample is preferably linked to the preceding real sample (based on the alpha-to-coverage ordering). Therefore, virtual sample 532 preferably links to real sample 531, virtual sample 534 preferably links to real sample 533, virtual sample 536 preferably links to real sample 535, virtual sample 538 preferably links to sample 537, virtual samples 540 and 541 preferably link to real sample 539, virtual sample 543 preferably links to real sample 542, and virtual sample 545 preferably links to real sample 544. Each virtual sample that is enabled is linked to a real sample that is also enabled, i.e., there are no orphaned virtual samples. This is important since each virtual sample inherits the color value of the real sample to which it is linked. In the event that a virtual sample is orphaned because a real sample it is linked to gets updated, the virtual sample will be linked to another real sample that is associated with a higher threshold in a subsequent step.

Figure 5D:
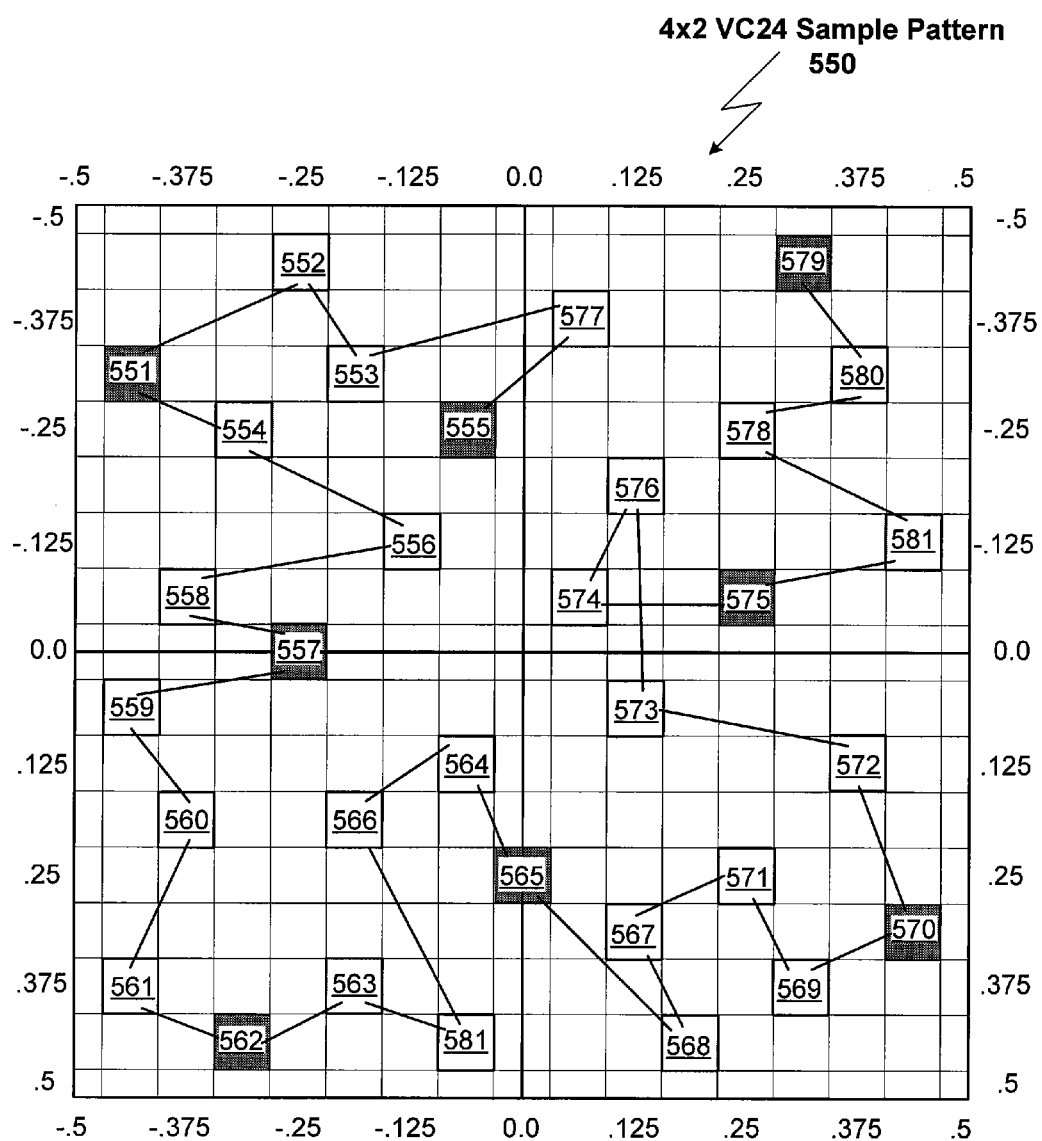
FIG. 5D illustrates another pixel sampling pattern that includes real and virtual samples, according to one embodiment of the invention.

FIG. 5D illustrates a 4×2 VC24 sampling pattern 550 that includes eight real samples and sixteen virtual samples, according to one embodiment of the invention. Samples 552, 553, 554, 556, 558, 559, 560, 561, 563, 564, 566, 567, 568, 569, 571, 572, 573, 574, 576, 577, 578, and 580 are virtual samples and samples 551, 555, 557, 562, 570, 575, and 579 are real samples. A similar number of virtual samples (three or four in this example) are ordered between each successive real sample. The lines between the samples indicate the alpha-to-coverage ordering (starting with real sample 579 and ending with real sample 551) that is used to enable and disable bits of the quantized alpha mask corresponding to each one of the samples. The alpha-to-coverage ordering in which bits of the quantized alpha mask are enabled for the 2×4 VC24 sampling pattern 550 is real sample 579, virtual sample 580, virtual sample 578, virtual sample 581, real sample 575, virtual sample 574, virtual sample 576, virtual sample 573, virtual sample 572, real sample 570, virtual sample 569, virtual sample 571, virtual sample 567, virtual sample 568, real sample 565, virtual sample 564, virtual sample 566, virtual sample 581, virtual sample 563, real sample 562, virtual sample 561, virtual sample 560, virtual sample 559, real sample 557, virtual sample 558, virtual sample 556, virtual sample 554, real sample 551, virtual sample 552, virtual sample 553, virtual sample 577, and real sample 555. In other embodiments, different orderings may be used for the real and virtual samples.

An alpha threshold table is defined for the 2×4 VC24 sample pattern 550 that specifies the quantized alpha mask. The number of transparency levels is thirty-three since there are thirty-two samples. As previously described, the quantized alpha mask is a function of t such that T(t)=(255*(t+1)+(NREAL+NVIRT)/2)/(NREAL+NVIRT+1). In some embodiments, the alpha-to-coverage function is disabled or bypassed when the alpha value is greater than or equal to 248. In sum, the alpha threshold table is constructed to enable the real samples and virtual samples according to the quantized alpha mask as an alpha value increases from zero to 255 and as t increases from zero to (NREAL+NVIRT−1).

Figure 6A:
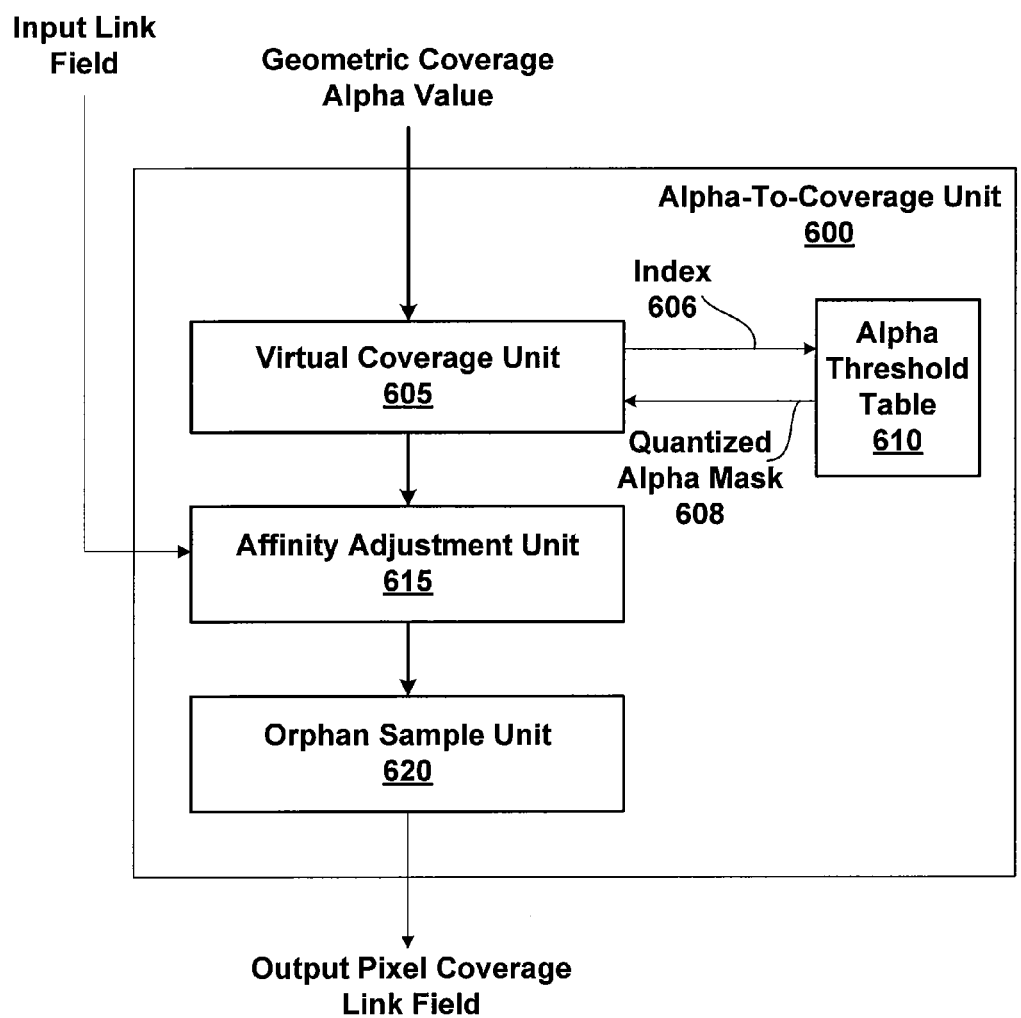
FIG. 6A is a block diagram of an alpha-to-coverage unit, according to one embodiment of the invention.

The alpha threshold table also specifies the real sample to which each virtual sample is preferably linked. A virtual sample is preferably linked to the preceding real sample (based on the alpha-to-coverage ordering). Therefore, virtual samples 580, 578, and 581 preferably link to real sample 579, virtual samples 574, 576, 573, and 572 preferably link to real sample 575, virtual samples 569, 571, 567, and 568 preferably link to real sample 570, virtual samples 564, 566, 581, and 563 preferably link to real sample 565, virtual samples 561, 560, and 559 preferably link to real sample 562, virtual samples 558, 556, and 554 preferably link to real sample 557, and virtual samples 552, 553, and 577 preferably link to real sample 551. Each virtual sample that is enabled is linked to a real sample that is also enabled, i.e., there are no orphaned virtual samples. This is important since each virtual sample inherits the color value of the real sample to which it is linked. In the event that a virtual sample is orphaned because a real sample it is linked to gets updated, the virtual sample will be linked to another real sample that is associated with a higher threshold in a subsequent step, FIG. 6A is a block diagram of an alpha-to-coverage unit 600, according to one embodiment of the invention. The alpha-to-coverage unit 600 may be included within the fragment processing unit 460 of FIG. 4 or TPC 310 of FIG. 3A or ROP 360 of FIG. 3B or have its implementation distributed over multiple units. The alpha-to-coverage unit 600 receives geometric coverage data and an alpha value for each pixel. The geometric coverage data indicates which of the real samples are covered when a graphics primitive intersects the pixel. The geometric coverage data may also account for real samples that are "killed" because the real sample fails the z-buffer test.

When the geometric coverage data indicates than none of the real samples for a pixel are visible, then the virtual coverage unit 605 may simply generate an output coverage mask of zero and avoid any further processing of the graphics primitive for that pixel. Otherwise, the virtual coverage unit 605 generates a virtual coverage mask that indicates which real and virtual samples are covered by a graphics primitive. During normal VCAA processing, the virtual coverage mask simply indicates which samples are covered by the primitive. In alpha-to-coverage mode, the virtual coverage mask is generated by copying real sample coverage to clusters of neighboring virtual samples. This reduces geometric edge quality in alpha-to-coverage mode, but guarantees that any virtual sample that survives both coverage masks has a surviving real sample it can link to.

The virtual coverage unit 605 computes the alpha coverage index 606 (t) from the alpha value based on the sampling mode. The index 606 is output to an alpha threshold table 610 and is used to read the quantized alpha mask 608. Other sources of information, e.g., geometry identifiers, may be combined with the index 606 to read the quantized alpha mask 608.

When alpha-to-coverage mode is enabled, the virtual coverage unit 605 combines the virtual coverage mask and the quantized alpha mask 608 to produce a pixel coverage mask. The pixel coverage mask may also represent whether or not each real sample was killed due to z buffering or other culling operations. In some embodiments, the virtual coverage mask is bitwise ANDed with the quantized alpha mask 608 to produce the pixel coverage mask that is output to the affinity adjustment unit 615. When the pixel coverage mask indicates that none of the real samples is visible, the virtual coverage unit 605 may simply generate an output coverage mask of zero and avoid any further processing of the graphics primitive for that pixel. When alpha-to-coverage mode is not enabled, the virtual coverage mask is output to the affinity adjustment unit 615 as the pixel coverage mask.

The affinity adjustment unit 615 links virtual samples that are covered to any real samples for which they have affinity and that also are covered. By the way the pixel coverage mask was constructed, there is guaranteed to be at least one covered real sample—the one below the virtual sample in the alpha-to-coverage ordering. The affinity adjustment unit 615 also removes links from virtual samples that are not covered to real samples that are covered. Note that removing these links can cause uncovered virtual samples to become orphans. The affinity adjustment unit 615 forwards the link fields, pixel coverage mask, and alpha coverage mask to the orphan sample unit 620.

The orphan sample unit 620 is configured to perform further adjustments to the link field of orphaned samples when alpha-to-coverage mode is enabled. For any orphaned virtual samples whose real sample of closest affinity is covered, links are created to all real samples that have zeroes in the quantized alpha mask 608. This ensures that the orphaned virtual samples will use the color of the background instead of the color of any of the covered real samples in order to avoid any visual artifacts along the seams between graphics primitives. The orphan sample unit 620 outputs the output pixel coverage value and the link field.

Figure 6B:
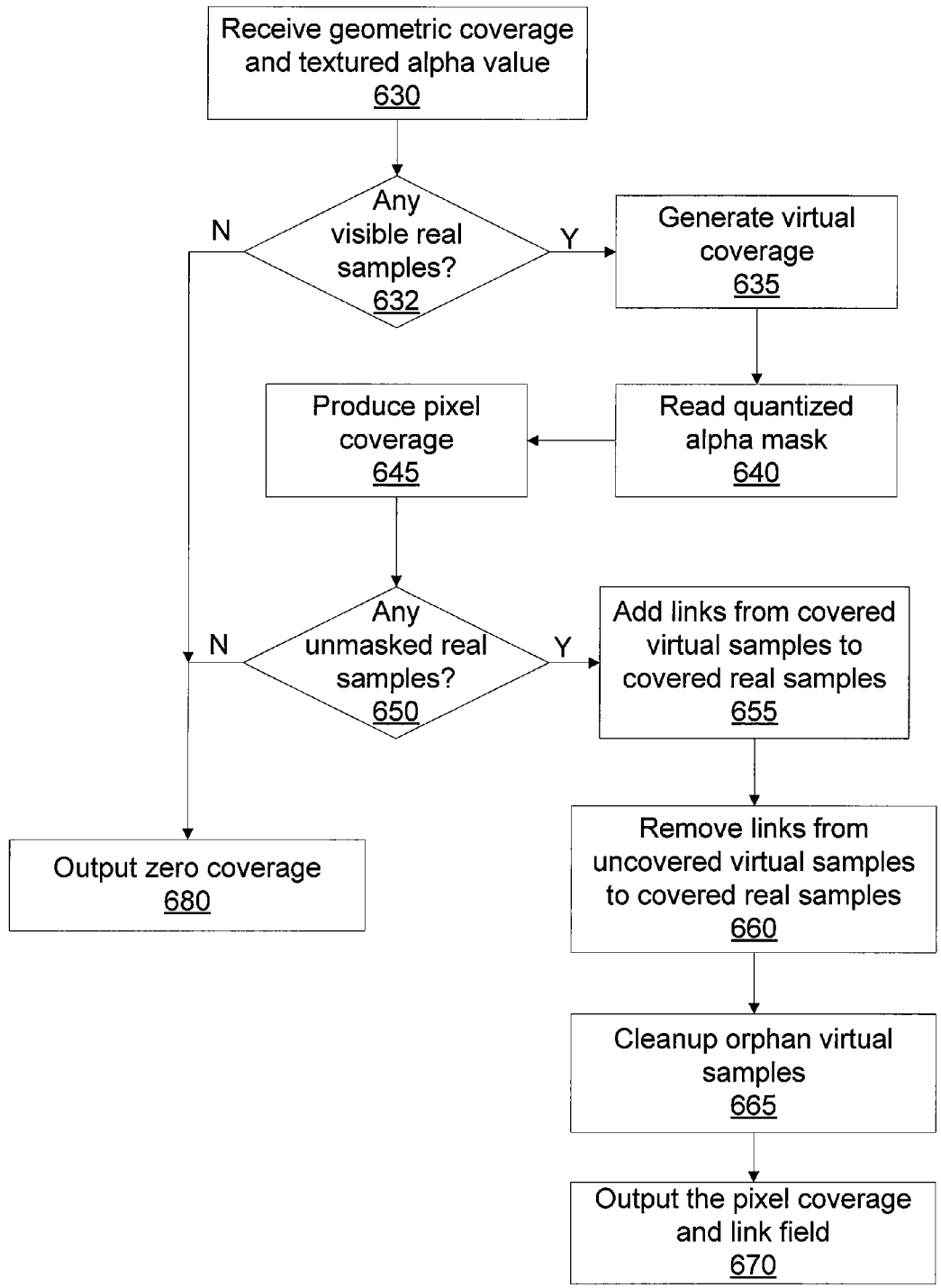
FIG. 6B is a flow diagram of method steps for determining an output coverage mask and virtual to real sample link field when the alpha-to-coverage mode is enabled, according to one embodiment of the present invention.

FIG. 6B illustrates a method for determining an output coverage mask and virtual to real sample link field when the alpha-to-coverage mode is enabled, according to one embodiment of the invention. Although the method steps are described in conjunction with the systems of FIGS. 1, 2, 3A, 3B, 3C, and 6A, persons skilled in the art will understand that any system configured to perform the method steps, in any order, is within the scope of the inventions.

At step 630 the alpha-to-coverage unit 600 receives the geometric coverage data and the alpha value for a pixel. At step 632 the virtual coverage unit 605 determines if any of the real samples in the pixel are visible, and, if not, then at step 680 the virtual coverage unit 605 outputs zero for the output coverage. Otherwise, at step 635 the virtual coverage unit 605 generates the virtual coverage data based on the sampling mode and the geometric coverage data. When alpha-to-coverage is disabled, a virtual coverage mask is generated from the geometric coverage at the real and virtual samples. When alpha-to-coverage is enabled, the geometric coverage of real samples are used to determine the virtual coverage mask bits for the cluster of virtual samples geometrically near each real sample and also immediately above it in the alpha threshold table. At step 640 the virtual coverage unit 605 determines the quantized alpha mask based on the alpha value and the sampling mode. At step 645 the virtual coverage unit 605 produces the pixel coverage mask by bitwise ANDing the virtual coverage mask and the quantized alpha mask.

At step 650 the virtual coverage unit 605 determines if any of the real samples in the pixel are covered according to the pixel coverage mask, and, if not, then at step 680 the virtual coverage unit 605 outputs zero for the output coverage. Otherwise, at step 655 the affinity adjustment unit 615 adds links from virtual samples with coverage to all covered real samples for which the virtual samples have affinity.

At step 660 the virtual coverage unit 605 removes (clears) any links between virtual samples that are uncovered and covered real samples. At step 665 the orphan sample unit 620 performs further adjustments to the link field when the alpha-to-coverage mode is enabled. Specifically, for any orphan virtual samples whose real sample of closest affinity is covered, links are created to all real samples that have zeroes in the quantized alpha mask 608. At step 670 the pixel coverage and the link field is output. The pixel coverage determines which real samples are updated. The link field may be used to compute a weight for each of the real samples during the antialiasing resolve phase. The color of each real sample is scaled by the weight to produce a final color for the real sample that is summed with the final colors of the other real samples in the pixel to produce the final color for the pixel.

The alpha-to-coverage technique allows the use of both virtual and real samples to increase the number of levels of transparency to NREAL+NVIRT+1 compared to NREAL+1 levels of transparency when only using real samples. Furthermore, the alpha-to-coverage mode may be enabled even when VCAA is enabled to produce higher quality antialiased images with transparency. The alpha-to-coverage unit 600 computes and processes the coverage masks without negatively impacting the shading performance.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method of producing a pixel coverage mask based on an alpha value, the method comprising:
combining a virtual coverage mask that indicates which virtual samples and real samples within a pixel are covered by a graphics primitive and a quantized alpha mask based on the alpha value and on an alpha-to-coverage ordering of the real samples and the virtual samples to produce the pixel coverage mask;
outputting the pixel coverage mask for the pixel; and
generating an antialiased image based on the pixel coverage mask,
wherein the quantized alpha mask represents the alpha value in a coverage mask format and indicates which virtual samples within the pixel are deemed to be covered based on the alpha value.

2. The method of claim 1, further comprising determining a link field that indicates links between the virtual samples and the real samples.

3. The method of claim 2, further comprising adjusting the link field based on the pixel coverage mask to link any orphaned virtual sample to one of the real samples, wherein each virtual sample inherits color data computed for the real sample to which the virtual sample is linked.

4. The method of claim 3, wherein the step of adjusting the link field comprises linking an orphaned virtual sample to at least one real sample that is masked by the pixel coverage mask.

5. The method of claim 2, wherein the sampling mode defines affinities that control the links between the virtual samples and the real samples.

6. The method of claim 2, further comprising the steps of:
computing a weight for the real samples that are enabled according to the pixel coverage mask, wherein the weight is increased for each virtual sample that links to one of the real samples; and
scaling the color data for the real samples that are enabled according to the pixel coverage mask by the computed weights to produce final color data for the real samples.

7. The method of claim 1, further comprising the step of determining the quantized alpha mask based on a sampling mode that defines a first number of the real samples and a second number of the virtual samples in the pixel.

8. The method of claim 7, further comprising the steps of:
determining the alpha-to-coverage ordering of the real samples and virtual samples based on the sampling mode; and
enabling bits of the quantized alpha mask based on the alpha-to-coverage order.

9. The method of claim 8, wherein all at least one of the bits in the quantized alpha mask corresponding to the real samples is enabled before any of the bits in the quantized alpha mask corresponding to the virtual samples are enabled.

10. A non-transitory computer-readable storage medium storing instructions that, when executed by a processor, cause the processor to produce a pixel coverage mask based on an alpha value, by performing the steps of:

combining a virtual coverage mask that indicates which virtual samples and real samples within a pixel are covered by a graphics primitive and a quantized alpha mask based on the alpha value and on an alpha-to-coverage ordering of the real samples and the virtual samples to produce the pixel coverage mask;

outputting the pixel coverage mask and the link field for the pixel; and generating an antialiased image based on the pixel coverage mask, wherein the quantized alpha mask represents the alpha value in a coverage mask format and indicates which virtual samples within the pixel are deemed to be covered based on the alpha value.

11. A system for producing a pixel coverage mask based on an alpha value, the system comprising:

a memory; and a processor that is coupled to the memory and includes an alpha-to-coverage unit that is configured to:

combine a virtual coverage mask that indicates which virtual samples and real samples within a pixel are covered by a graphics primitive and a quantized alpha mask based on the alpha value and on an alpha-to-coverage ordering of the real samples and the virtual samples to produce the pixel coverage mask;

output the pixel coverage mask and the link field for the pixel; and generating an antialiased image based on the pixel coverage mask, wherein the quantized alpha mask represents the alpha value in a coverage mask format and indicates which virtual samples within the pixel are deemed to be covered based on the alpha value.

12. The system of claim 11, further comprising a memory storing instructions that, when executed by the processor, configure the alpha-to-coverage unit to:

combine the virtual coverage mask and the quantized alpha mask; and output the pixel coverage mask and the link field for the pixel.

13. The system of claim 11, wherein the alpha-to-coverage unit is further configured to determine a link field that indicates links between the virtual samples and the real samples.

14. The system of claim 13, wherein the alpha-to-coverage unit is further configured to adjust the link field based on the pixel coverage mask to link any orphaned virtual sample to one of the real samples, wherein each virtual sample inherits color data computed for the real sample to which the virtual sample is linked.

15. The system of claim 14, wherein the adjusting of the link field comprises linking an orphaned virtual sample to at least one real sample that is masked by the pixel coverage mask.

16. The system of claim 13, wherein the sampling mode defines affinities that control the links between the virtual samples and the real samples.

17. The system of claim 13, wherein the processor is further configured to:

compute a weight for the real samples that are enabled according to the pixel coverage mask, wherein the weight is increased for each virtual sample that links to one of the real samples; and scale the color data for the real samples that are enabled according to the pixel coverage mask by the computed weights to produce final color data for the real samples.

18. The system of claim 11, wherein the alpha-to-coverage unit is further configured to determine the quantized alpha mask based on a sampling mode that defines a first number of the real samples and a second number of the virtual samples in the pixel.

19. The system of claim 18, wherein the alpha-to-coverage unit is further configured to:

determine the alpha-to-coverage ordering of the real samples and virtual samples based on the sampling mode; and enable bits of the quantized alpha mask based on the alpha-to-coverage order.

20. The system of claim 19, wherein at least one of the bits in the quantized alpha mask corresponding to the real samples is enabled before any of the bits in the quantized alpha mask corresponding to the virtual samples are enabled.

\* \* \* \* \*